United States Patent [19]

Price

[11] Patent Number: 4,557,110
[45] Date of Patent: Dec. 10, 1985

[54] MASTER CYLINDER ASSEMBLY FOR A VEHICLE BRAKING SYSTEM

[75] Inventor: Anthony G. Price, Birmingham, England

[73] Assignee: Lucas Industries public limited company, Birmingham, England

[21] Appl. No.: 662,530

[22] Filed: Oct. 18, 1984

Related U.S. Application Data

[63] Continuation of Ser. No. 373,275, Apr. 29, 1982, abandoned.

[30] Foreign Application Priority Data

May 20, 1981 [GB] United Kingdom ............... 8115447

[51] Int. Cl.$^4$ ............................................. F15B 7/08
[52] U.S. Cl. ......................................... 60/581; 60/589
[58] Field of Search ................................ 60/581, 589

[56] References Cited

U.S. PATENT DOCUMENTS

| 2,444,181 | 6/1948 | Baldwin | 60/589 |
| 3,181,299 | 5/1965 | Page | 60/589 |
| 3,568,441 | 3/1971 | Walker | 60/581 |
| 3,885,391 | 5/1975 | Campbell et al. | 60/581 |
| 4,006,593 | 2/1977 | Edwards | 60/581 |
| 4,329,846 | 5/1982 | Gaiser | 60/589 |
| 4,419,862 | 12/1983 | Farr | 60/589 |

FOREIGN PATENT DOCUMENTS 1141877  2/1969  United Kingdom ............... 50/589

Primary Examiner—Sheldon J. Richter
Assistant Examiner—Randolph A. Smith
Attorney, Agent, or Firm—Scrivener Clarke Scrivener and Johnson

[57] ABSTRACT

In a master cylinder assembly separate master cylinders are connected by a common transfer passage through which the pressure spaces of the master cylinders in advance of pistons are in communication when the master cylinders are operated simultaneously, and communication between the pressure spaces is cut off by a transfer valve mechanism when one of the master cylinders is operated on its own. Each piston is guided to slide in its respective bore only by the sliding engagement with the bore of a guide portion of the piston and the guide portion is disposed on the outermost side of a transfer port with which the transfer passage is in communication when the piston is in a retracted position.

7 Claims, 2 Drawing Figures

MASTER CYLINDER ASSEMBLY FOR A VEHICLE BRAKING SYSTEM

This application is a continuation of application Ser. No. 373,275, filed Apr. 29, 1982, now abandoned.

SPECIFIC DESCRIPTION

This invention relates to master cylinder assemblies for vehicle hydraulic braking systems of the kind in which separate master cylinders are connected by a common transfer passage through which pressure spaces in the cylinders in advance of pistons are in communication when the master cylinders are operated simultaneously, and communication between the pressure spaces is cut off by transfer valve means when one of the master cylinders is operated on its own.

In known cylinder assemblies of the kind set forth, when the master cylinders are operated simultaneously, the transfer passage places the two pressure spaces in free communication to compensate for differential wear of the linings of brakes which the master cylinders operate, typically the brakes on wheels on opposite sides of the vehicle, and such free communication is maintained throughout the stroke lengths of the pistons of the master cylinders. This means that transfer ports in the master cylinders which lead to the pressure spaces and to which the transfer passage is connected must be in open communication at all times with the pressure spaces, irrespective of the relative positions of the pistons in the bores. This is usually achieved by constructing the pistons of substantial lengths and, for stability, it is necessary to support each piston in its bore on opposite sides of the transfer port by spaced lands. An axially extending passage is provided in the piston between the two lands to define a clearance between the bore and the piston and which is in open communication with the pressure space, the length of the passage being chosen such that the clearance is in free unrestricted communication with the transfer port throughout the stroke length of the piston. The passage is usually of annular outline and extends between a radial flange at the inner end of the piston and a seal which is housed in a groove adjacent to the outer end of the piston of which the portion of the piston adjacent to its outermost end defines the second land.

We have found that a substantial proportion of compensating fluid flow through the transfer passage occurs during simultaneous initial movement of the pistons in a brake-applying direction.

According to our invention in a master cylinder assembly of the kind set forth each piston is guided to slide in its respective bore only by the sliding engagement with the bore of a guide portion of the piston and the guide portion is disposed on the outermost side of a transfer port with which the transfer passage is in communication when the piston is in a retracted position.

Since the piston is guided in the bore only on the outermost side of the transfer port by means of the guide portion, the piston can be relatively short axially which, in turn, will mean that the overall length of the master cylinder is of a complementary length. Thus the assembly is relatively more compact and therefore lighter in weight and cheaper to produce.

The overall length of the piston including the length of the guide portion by which the piston is guided are chosen to ensure that the piston is of sufficient length to open a transfer valve controlling flow through the transfer port to the transfer passage when the master cylinder is operated and to maintain stability, at the same time ensuring that a substantial proportion of compensating flow can occur before the piston is advanced sufficiently for the guide portion to close the transfer port, thereby restricting further compensating flow.

One embodiment of our invention is illustrated in the accompanying drawings in which.

Figure 1:
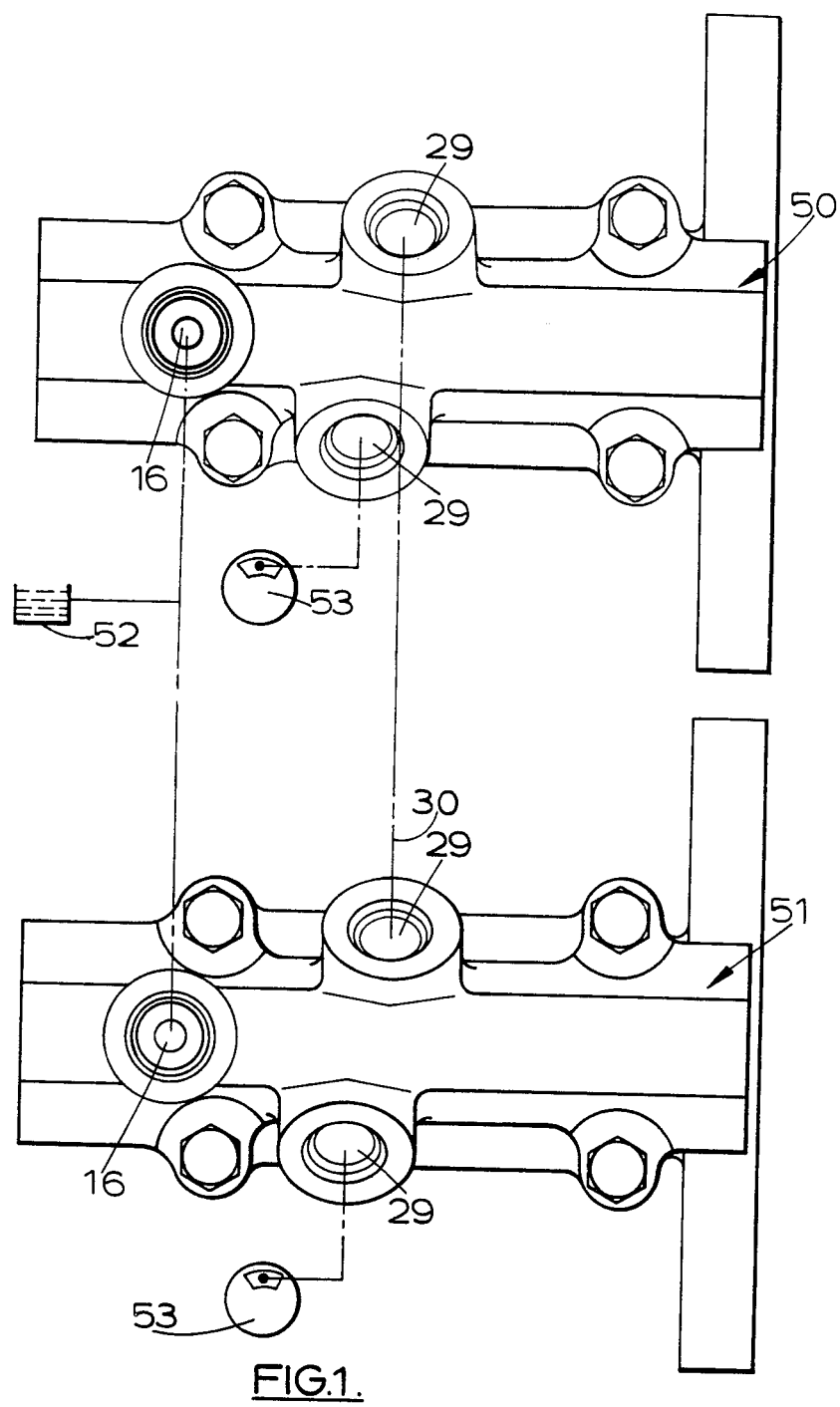
FIG. 1 is a plan of a dual master cylinder assembly.
Figure 2:
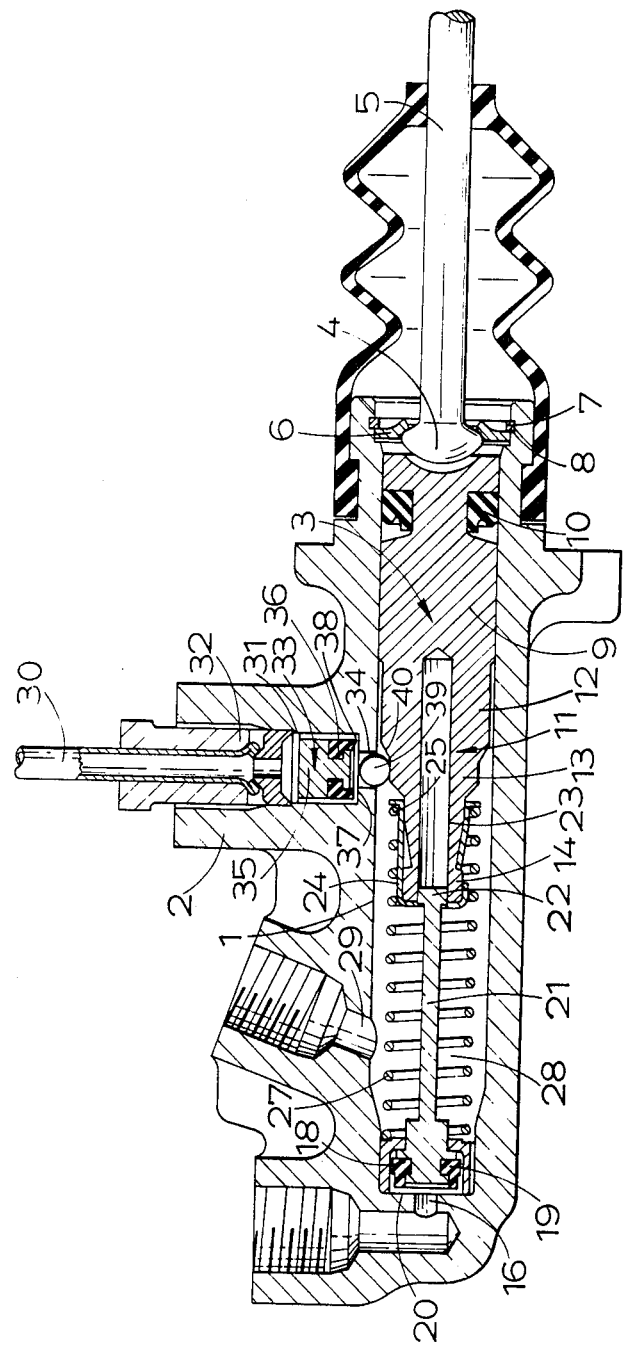
FIG. 2 is a longitudinal section through an hydraulic master cylinder comprising one of a pair of similar master cylinders which comprise a dual master cylinder assembly.

A dual hydraulic master cylinder assembly comprises two master cylinders 50, 51, each as illustrated in FIG. 2. Each master cylinder comprises a bore 1 provided in a body 2. The two bodies are identical in construction and can be installed in any convenient spaced locations in a vehicle.

As the two master cylinders 50, 51 are identical in construction, only one need be described.

A piston 3 working in the bore 1 is engaged at its rear end by a part-spherical head 4 on a pedal-operated push-rod 5. A stop for the head 4 is formed by an annular collar 6 located by a spring ring or circlip 7 received in an annular groove 8 in the bore 1.

The piston 3 comprises a guide portion 9 of substantial length working in the bore 2 and carrying a pressure seal 10, and a forward extension 11 of reduced diameter. The extension 11 comprises three stepped portions 12, 13 and 14 of different areas, of which the portion 12 of greater area is contiguous with the guide portion 9, and the portion 14 of smallest area comprises the innermost portion of the extension 11.

A recuperation port 16 at the forward end of the body 2 for connection to a reservoir 52 for hydraulic fluid is controlled by a recuperation valve 18 comprising a head 19 for engagement with a seating 20 surrounding the port 16. The head 19 is carried by the forward end of an axially extending stem or rod 21 of which the opposite end carries an enlarged head 22 guided to slide in a longitudinally extending bore 23 in the adjacent end of the extension 11. The head 22 is retained within the bore 23 by a thimble 24 which fits over the portion 14 of the extension 11. A flange 25 on the thimble 24 forms an abutment for one end of a compression return spring 27 of which the opposite end acts on a cage in which the head 19 is housed. In the position shown in the drawings the spring 27 urges the piston 3 into a retracted position with the head 19 spaced from the seating 20 by the engagement of the thimble 24 with the head 22.

A pressure space 28 defined in the bore 1 in front of the piston 3 is adapted to be connected to a vehicle brake 53 through an outlet port 29. Normally the pressure space 28 of one master cylinder will be connected to brakes on one side of a vehicle, for example an agricultural tractor, and the pressure space of the other master cylinder will be connected to brakes on the opposite side of the tractor. Thus both master cylinders will be operated simultaneously to retard the vehicle, and independently for steering.

The two pressure spaces 28 of the master cylinders are interconnected by a transfer passage comprising a pipe-line 30 which is connected at each opposite end to a radial outlet passage 31 in the wall of the body 2 through a suitable union 32, a transfer valve 33, and a transfer port 34.

Each passage 31 extends upwardly from its respective bore 1 when the master cylinders are installed in a vehicle in their positions of use. It will be observed that when the piston is in its retracted position of FIG. 2, the guide portion 9 is disposed between the transfer port 34 and the pressure seal 10.

The transfer valve 33 comprises a valve member constituted by a piston 35, and a seal 36 of elastomeric material, suitably rubber, mounted on one end of the piston 35, the seal 36 being engageable with a seating 37 comprising a shoulder at a step in diameter in the passage 31 and surrounding the port 34.

The seal 36 is provided with a plurality of integral, discrete, deformable, and collapsible resilient axially extending projections 38 on the circumference of its face adjacent to the seating 37, and, in a normal intermediate position, the valve member is urged towards the seating 37 so that the projections 38 engage with the seating, the remainder of the face of the seal 36 being held out of direct engagement with the seating 37 by the projections 38.

A thrust member 39 in the form of a ball is guided in the transfer port 34. The thrust member 39 is spaced from the seal 36 of the valve member and, in the retracted position shown, engages with the intermediate stepped portion 13 of the extension 11.

When one of the master cylinders 50 is operated a short forward movement of the piston 3 with corresponding compression of the spring 27 is sufficient to cause the head 19 to engage with the seating 20 to isolate the reservoir 52 from the pressure space 28. Simultaneously, or almost immediately thereafter, the piston 3 also urges the thrust member 39 radially outwardly by the engagement therewith of an inclined annular face 40 comprising a shoulder between the portions 12 and 13. This movement urges the valve member 35 away from the adjacent seating 37 and into a fully open position. Further movement of the piston 3 in the same direction causes fluid to flow through the outlet port 29 to the brake and to the transfer passage 30 through the open transfer valve 33 which, in turn, creates a pressure drop across the valve member of the other master cylinder 51, urging that valve member towards the adjacent seating in the body of that master cylinder 51. The resilient projections 38 on the seal 36 collapse so that the face of the seal can engage fully with the seating thereby closing the transfer valve 33 of the said other master cylinder to isolate the pressure spaces 28 of the two master cylinders from each other.

Fluid continues to be supplied from the outlet port 29 throughout the stroke length of the piston 3, but flow through the pipe-line 30 is restricted when the guide portion 9 of the piston 3 closes the transfer port 34. Since the greatest proportion of flow through the pipe-line 30 will have occured before the portion 9 closes the transfer port 34, this does not represent a serious disadvantage. In fact under one particular condition such closure of the transfer port 34 represents a considerable advantage since no transfer of fluid between the pressure spaces 28 and through the pipe-line 30 can occur should the other, inoperative, master cylinder be operated accidentally, by the foot of the driver accidentally snagging the pedal of that otherwise inoperative master cylinder.

When the master cylinders are operated simultaneously the thrust members 39 both act in opposite directions to hold their respective valve members away from the seatings 37, so that the pressure spaces 28 are in free communication for differential wear of the linings of the brakes which the master cylinders operate, throughout an initial movement of the piston 3 when substantially all compensation takes place, until the transfer ports 34 are closed as described above.

What is claimed is:

1. A master cylinder assembly for a vehicle hydraulic system comprising first and second master cylinders, each said master cylinder comprising a housing having a bore, a piston working in said bore including a pressure seal, a pressure space defined in said bore in advance of said piston, and a transfer port in communication with said pressure space, a common transfer passage interconnecting said pressure spaces through said transfer ports when both said master cylinders are operated simultaneously, and transfer valve means for cutting-off communication between said pressure spaces when one of said master cylinders is operated on its own, wherein each piston is provided with a guide portion by means of which said piston is guided to slide in the respective one of said bores only by the sliding engagement of said guide portion with said bore, and said guide portion is disposed on the outermost side of said transfer port with which said transfer passage is in communication and between said transfer port and said pressure seal when said piston is in a retracted position, each said guide portion having an outer end, and each said piston having an axially extending portion for operating said transfer valve means and which extends integrally from said outer end of said guide portion and is of an effective area less than said guide portion, a discrete region of said axially extending portion co-operating with said valve means, said axially extending portion otherwise being spaced radially from said bore to define a clearance therebetween which constitutes a part of said pressure space, said guide portion comprising a sole support for said piston in said bore with said piston otherwise unsupported in said bore on said innermost side of said transfer port, at least when said piston is in said retracted position.

2. A master cylinder assembly as claimed in claim 1, wherein a transfer valve controls communication between each said transfer port and said common transfer passage, and each said transfer valve comprises a seating surrounding said transfer port, and a valve member for engagement with said seating and with which the piston of a respective said master cylinder is adapted to co-operate to urge said valve member away from said seating when that master cylinder is operated, said valve member being urged into engagement with said seating by pressure in the transfer passage when the other of said master cylinders is operated on its own.

3. A master cylinder assembly as claimed in claim 2, wherein the relative proportions between the overall length of said piston and the length of said guide portion are chosen to ensure that said transfer valve can open and that a substantial proportion of compensating flow can occur before said piston is advanced sufficiently for said guide portion to close the transfer port, thereby restricting further compensating flow and preventing the transfer of fluid into said pressure space of that master cylinder should the other of said master cylinders be operated accidentally.

4. A master cylinder assembly as claimed in claim 3, wherein an extension of reduced area is provided on said piston at the forward end of said guide portion and a thrust member is provided through which said extension acts on the valve member, said extension having an inner portion, and an intermediate portion contiguous with said inner portion and said guide portion and of a diameter smaller than that of said guide portion but greater than that of said inner portion, said thrust member being adapted to co-operate with said inner portion when said piston is in the retracted position whereby said valve member can engage with said seating, said thrust member being adapted to co-operate with said intermediate portion to urge said valve member away from said seating when said piston is advanced in response to operation of the master cylinder, and said thrust member being adapted to co-operate with said guide portion when said piston has reached a position in which said guide portion is adapted to close said transfer port.

5. A master cylinder assembly as claimed in claim 4, wherein an inclined annular face comprising a step between said inner and intermediate portions of said piston is engageable with said thrust member as said piston is advanced in said bore.

6. A master cylinder assembly as claimed in claim 4, wherein said valve member is unsprung.

7. A master cylinder assembly as claimed in claim 4, wherein said thrust member comprises a ball.

* * * * *